United States Patent [19]

Kimura

[11] 4,240,690

[45] Dec. 23, 1980

[54] SLIDING FINGER PLATE FOCUS ADJUSTING DEVICE FOR A BINOCULAR

[75] Inventor: Hideyuki Kimura, Ichikawa, Japan

[73] Assignees: Hideyuki Kimura; Tokyo Bussan Kabushiki Kaisha, both of Japan

[21] Appl. No.: 3,785

[22] Filed: Jan. 15, 1979

[30] Foreign Application Priority Data

Nov. 27, 1978 [JP] Japan .................. 53-162999[U]

[51] Int. Cl.³ ................... G02B 7/06; G02B 23/00
[52] U.S. Cl. ................................ 350/36; 350/76
[58] Field of Search ............. 350/76, 75, 36, 77, 350/46, 47

[56] References Cited

U.S. PATENT DOCUMENTS

| 4,066,329 | 1/1978 | Van Exel | 350/77 |
| 4,171,865 | 10/1979 | Kamakura | 350/36 |

FOREIGN PATENT DOCUMENTS

| 6745 | 1/1922 | Netherlands | 350/77 |
| 9204 | of 1897 | United Kingdom | 350/77 |

Primary Examiner—Jon W. Henry

Attorney, Agent, or Firm—Polster, Polster and Lucchesi

[57] ABSTRACT

A focus adjusting device for a binocular which is constructed with a pair of object lens barrels, a pair of ocular lens barrels slidably fitted in the objective lens barrels, brackets for connecting the pairs of the object lens barrels and the ocular lens barrels, a hollow cylindrical shaft, on which the brackets are centrally hinged, a back-and-forth moving shaft inserted concentrically into the hollow cylindrical shaft, a seat member in a semi-circular shape, through which the outer peripheral surface of the hollow cylindrical shaft pierces, the seat member having a flattened platform, a finger plate member slidably fitted on the top flattened platform of the seat member to move left and right directions, each of the cylindrical shaft, the back-and-forth moving shaft, and the finger plate member having a long hole, through which a single pin studded upright from the back-and-forth moving shaft passes, the long hole in the finger plate member being formed slantly so that when the finger plate member is moved left-and-right direction, the upright pin causes the ocular lens barrels to move back and forth with the back-and-forth moving shaft to perform focus operation.

2 Claims, 6 Drawing Figures

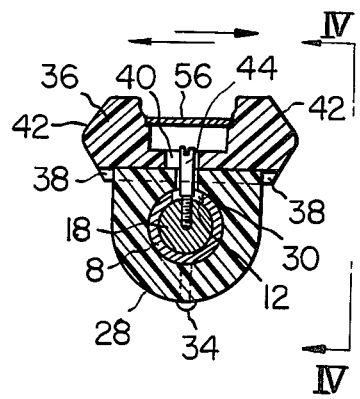
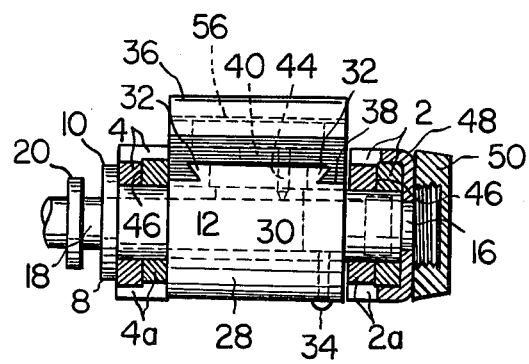
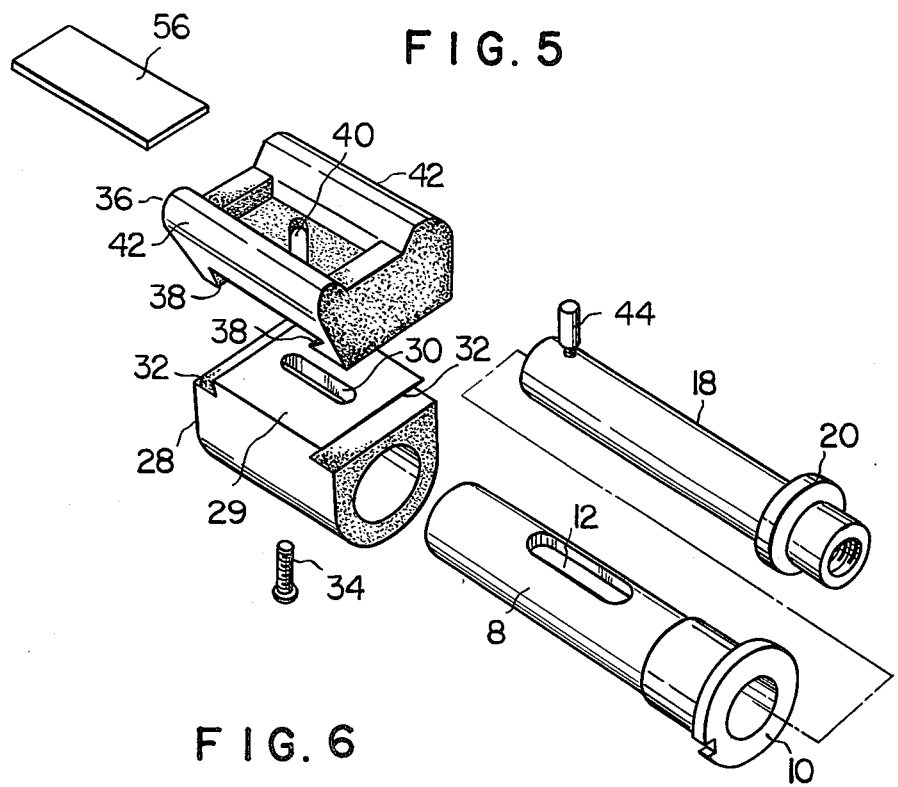

SLIDING FINGER PLATE FOCUS ADJUSTING DEVICE FOR A BINOCULAR

BACKGROUND OF THE INVENTION

1. Field of the Invention

This invention relates to a focus adjusting device for a binocular. More particularly, it is concerned with improvement in the manipulating device for the focus adjustment of the optical system in the binocular.

In the conventional focus adjusting device for a binocular, there has mostly been used a type, in which a focus adjusting ring is rotated by bending and stretching actions of fingertip to carry out focusing of the optical system to an object in a distance place, hence the focusing operation lacks in quickness. As the result, when it is desired to view a telescopic object, such delayed focusing action often causes missing of the object out of view. Also, when the telescopic object is quick moving such as, for example, sport competition, horse racing, theatrical performances, and others, it is very difficult to carry out the focus adjusting operation by correcting focus of the object so as to constantly bring a clear image of the object into view.

SUMMARY OF THE INVENTION

It is an object of the present invention to provide an improved focus adjusting device which solves the disadvantages inherent in the known type of focus adjusting device, and which can perform a speedy and accurate focus adjustment.

According to the present invention, briefly speaking, there is provided a focus adjusting device for a binocular, in which a sliding member is used in place of the conventional rotatory ring as the focus adjusting member, in association with the sliding movement of which the ocular lens barrels is caused to move back and forth with respect to the main barrels containing therein a pair of monocular prism telescopes.

There has thus been outlined, rather broadly, the more important features of the present invention in order that the detailed description thereof that follows may be better appreciated. There are, of course, additional features of the invention that will be described hereinafter and which will form the subject of the claims appended hereto. Those skilled in the art will appreciate that the conception, upon which this disclosure is based may readily be utilized as a basis for the designing of other construction for carrying out the several purposes of the invention. It is important, therefore, that the claims be regarded as including such equivalent construction as do not depart from the spirit and scope of the present invention.

BRIEF DESCRIPTION OF THE ACCOMPANYING DRAWING

Specific embodiment of the present invention has been chosen for the purpose of illustration and description, and is shown in the accompanying drawing, forming a part of the specification, in which:

FIG. 3 is a cross-sectional view of the fingertip manipulating plate section for the focus adjustment, taken along the line III—III in FIG. 1;

FIG. 4 is a side elevational view, partly in longitudinal cross-section, taken along the line IV—IV in FIG. 3;

FIG. 5 is an exploded view of the main part of the focus adjusting member; and

FIG. 6 is a perspective view of an upper and lower movement limiting member for the centrally hinged bracket to adjust the interpupillary span.

DETAILED DESCRIPTION OF PREFERRED EMBODIMENT

In the following, the present invention in its preferred embodiment will be explained in detail in reference to the accompanying drawings.

Figure 1:
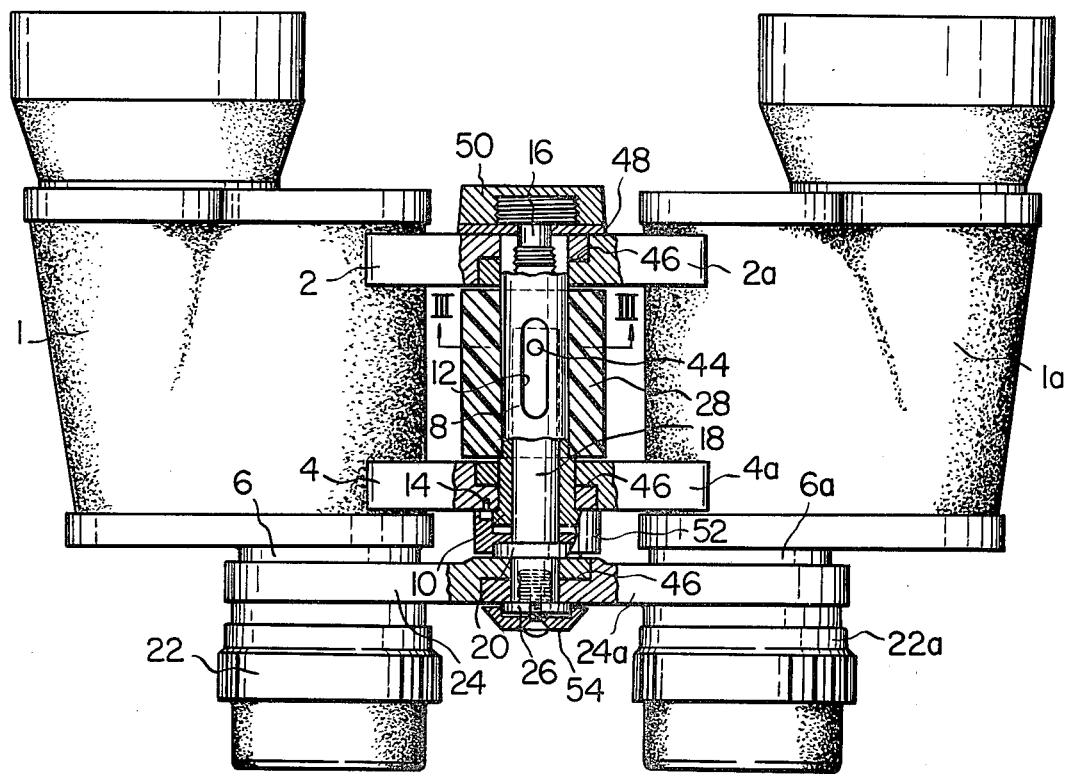
FIG. 1 is a plan view, partly cut away, of a binocular provided with the focus adjusting device according to the present invention.
Figure 2:
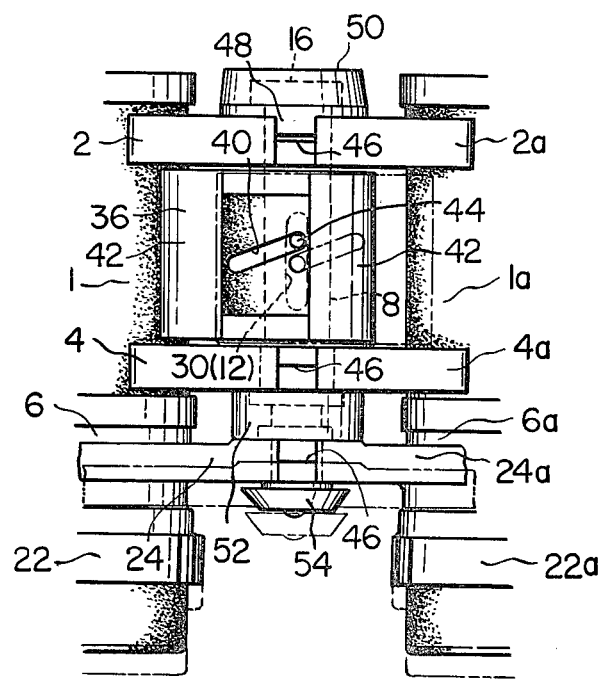
FIG. 2 is an enlarged plan view of a fingertip manipulating plate section for the focus adjustment.

Referring to FIGS. 1 to 6, reference numerals 1, 1a designate a pair of left and right main barrels for the binocular containing therein a pair of monocular prism telescopes. 2, 4, 2a and 4a designate brackets for connecting the left and right main barrels, the brackets being projectively provided in the front and rear positions of the opposing sides of the lens barrels. A numeral 8 refers to a single hollow cylindrical shaft (base shaft), on which the abovementioned front and rear brackets for hinge-connecting the pair of main barrels in a freely swingable manner. This common cylindrical shaft is engaged at its rear end flange 10 with a notch 14 formed in one of the connecting brackets 4 so as to stop excessive rotation. On the upper side surface of the single hollow cylindrical shaft 8, there if formed a long hole, or a slot, 12 in the front-and-rear direction of the shaft. A reference numeral 16 designates a slip-preventive screw (or pin face screw) for the hollow cylindrical shaft 8 which is screw-fitted in the front end of the cylindrical shaft 8. With this screw 16, the tightening force to the brackets 2, 2a and 4, 4a is adjusted to thereby bring the resistance at a swing of the left and right barrels 1, 1a with the cylindrical shaft 8 as the center of the hinging to an appropriate degree.

A reference numeral 18 is a shaft which moves back and forth, and inserted into the hollow cylindrical shaft 8 in a concentric manner therewith. 22 and 22a refer to left and right ocular lens barrels which are loosely fitted onto holding barrels 6 and 6a, respectively, at the rear end part of the left and right main barrels 1 and 1a. 24 and 24a are brackets integrally formed with each of the ocular lens barrels 22 and 22a. Each of the brackets 24, 24a are mutually hinged together in a freely swingable manner at the shaft portion between a brim member 20 integrally formed at the rear part of the shaft 18 and the slip-preventive screw fitted at the rear end of the shaft. Accordingly, when the shaft 18 is caused to move back and forth, the bracket 24 and 24a, hence the left and right ocular lens barrels 22, 22a move back and forth along with the shaft 18.

A reference numeral 28 refers to a substantially semi-circular seat member in its cross-section, as shown in FIG. 3. This seat member has a cylindrical passage through it and is positioned caged and between the front brackets 2 and 2a and the rear brackets 4 and 4a the left and right barrels. The cylindrical shaft 8 extends through the passage. On the flattened platform 29 on the seat member 28, there is perforated a long hole, or a slot, 30 in correspondence to the long hole 12 in the hollow cylindrical shaft 8.

A reference numeral 36 designates a focus adjusting finger plate member slidably fitted in the sidewise direction perpendicular to the moving direction of the lens barrels of the binocular by means of dovetail engagements 32 and 38 with respect to the flattened surface part 29 of the seat member 28. On the upper surface of the finger plate member 36, there is perforated a long hole, or a slot, 40 in an oblique direction with respect to the left-right moving direction of the finger plate member.

A reference numeral 44 designates a fixed pin which is screw-fitted at its tip end into the back-forth moving shaft 18, extending radially outwardly and passing through the oblique long hole 40 of the finger plate member 36, the long hole 30 of the seat member 28, and the long hole 12 of the hollow cylindrical shaft 8.

A numeral 46 refers to a washer in a thin thickness interposed between the centrally hinged brackets 2 and 2a (4 and 4a). A numeral 48 refers to an upper and lower movement restricting member for the centrally hinged bracket interposed between the slip-preventive screw 16 and the bracket 2 to adjust the interpupillary span, i.e., the bending angle of the left and right main barrels. A numeral 50 refers to an ornamental cap (tailoring cap) to cover the slip-preventive screw 16. A reference numeral 52 designates an ornamental cap to cover the flanged part 10 of the cylindrical shaft 8 and the brim member 20 of the back-forth moving shaft 18. A numeral 54 refers to a frusto-conical member which is screw-fitted to the slip-preventive screw 26 hinging the brackets 24 and 24a of the ocular lens barrels 22, 22a. A numeral 56 refers to an ornamental plate to cover the oblique long hole formed in the finger plate member 36.

The focus adjusting device for a binocular according to the present invention which is in the above-described construction operates in the following manner.

The binocular as assembled is held in both hands in the normal fashion as in the conventional binocular. When observing a distant object, the middle or pointing fingertips of both left and right hands are placed on the left and right fingertip knobs 42, 42 of the finger plate member 36, and the finger plate member is slidingly moved in the left or right direction with respect to the seat member 28. Upon slide-movement of the finger plate member 36, the pin 44 studded into the shaft 18 is guided in the front and rear directions along the long holes 30 and 12 respectively formed in the seat member 28 and the cylindrical shaft 8 due to their cooperative action with the oblique hole 40. As the result, the back-and-forth moving shaft 18 is driven back and forth, hence the left and right ocular lens barrels 22, 22a move back and forth, accordingly, relative to the barrels 1 and 1a, whereby the focusing is carried out.

The focus adjusting finger plate member 36 may also be provided to slide in the front-and-back direction of the binocular relative to the seat member 28 so that it may be operated in that direction to perform the focusing operation.

As stated in the foregoing, since the present invention is so constructed that the sliding finger plate member 36 is used as the focus adjusting member in place of the conventional focus adjusting ring, and the ocular lens barrels 22 and 22a are caused to move back and forth with respect to the main barrels 1 and 1a in association with the sliding operation of the finger plate member, the focusing operation can be carried out readily and quickly by merely sliding the finger plate member in the left and right directions.

As the consequence, even when a telescopic object is to be observed quickly, the focusing operation can be done instantaneously, so that loss of the object due to delayed focusing operation can be avoided. Also, even when the telescopic object is constantly moving here and there, catching of the object and clear sighting thereof can always be done readily in pursuance of its movement. Also, the focus adjusting operation can be done with one hand, which is effective and proper as the improvement in the focus adjusting device for the binocular.

What is claimed is:

1. A focusing adjusting device for a binocular which comprises in combination:
   (a) a pair of object lens barrels;
   (b) a pair of ocular lens barrels slidably fitted in said object lens barrels;
   (c) means for connecting said pair of object lens barrels and ocular lens barrels;
   (d) a hollow cylindrical shaft, on which said connecting means are centrally hinged;
   (e) a back-and-forth moving shaft inserted concentrically into said hollow cylindrical shaft, said back-and-forth moving shaft having a pin studded radially from it;
   (f) a seat member in a semi-circular shape, having an axial passage through which said hollow cylindrical shaft extends, said seat member having a flattened platform; and
   (g) a finger plate member slidably fitted on the top flattened platform of said seat member to move in a predetermined direction,
      each of said cylindical shaft, seat member, and finger plate member havin a long hole, through which said pin from said back-and-forth moving shaft passes, said long hole in said finger plate member being formed slantly so that when the finger plate member is moved in such definite direction, said pin causes said ocular lens barrels to move back and forth along with said back-and-forth moving shaft to perform focusing operation.

2. The focus adjusting device as set forth in claim 1, wherein the sliding direction of said finger plate member is in the left-and-right direction.

* * * * *